(No Model.) 2 Sheets—Sheet 1.
E. WOODWARD.
TACK DRIVING MACHINE.
No. 426,160. Patented Apr. 22, 1890.
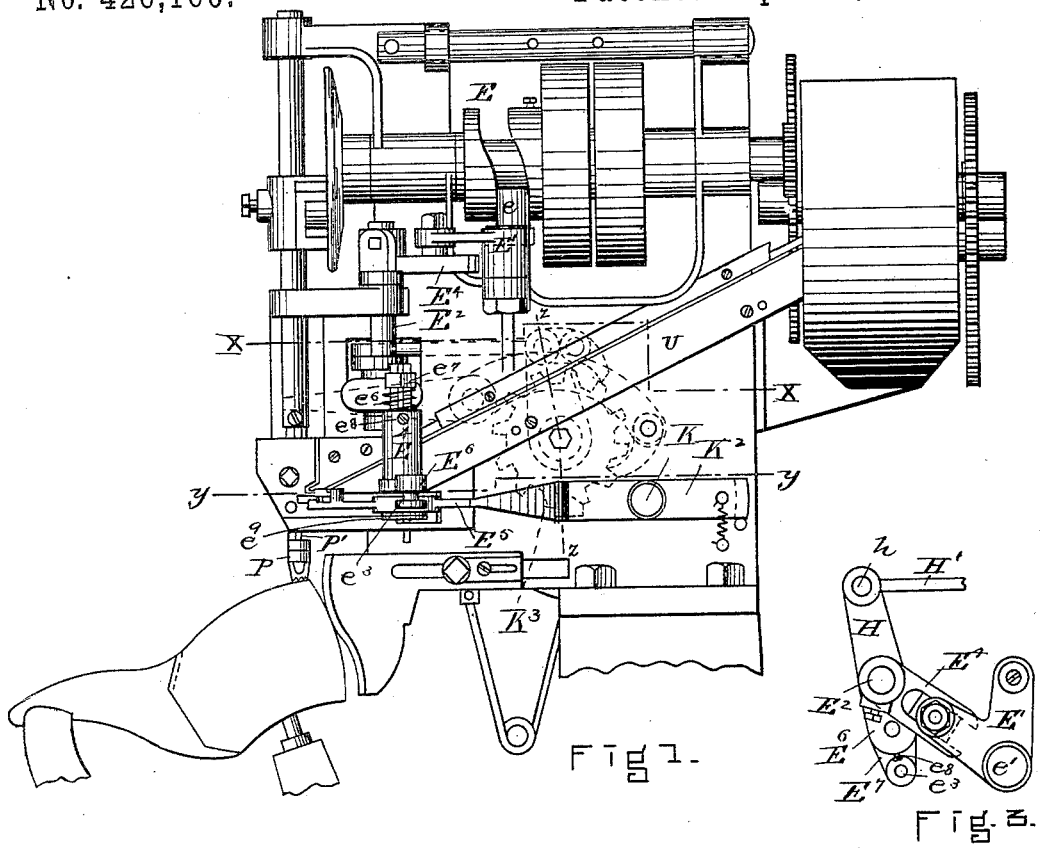
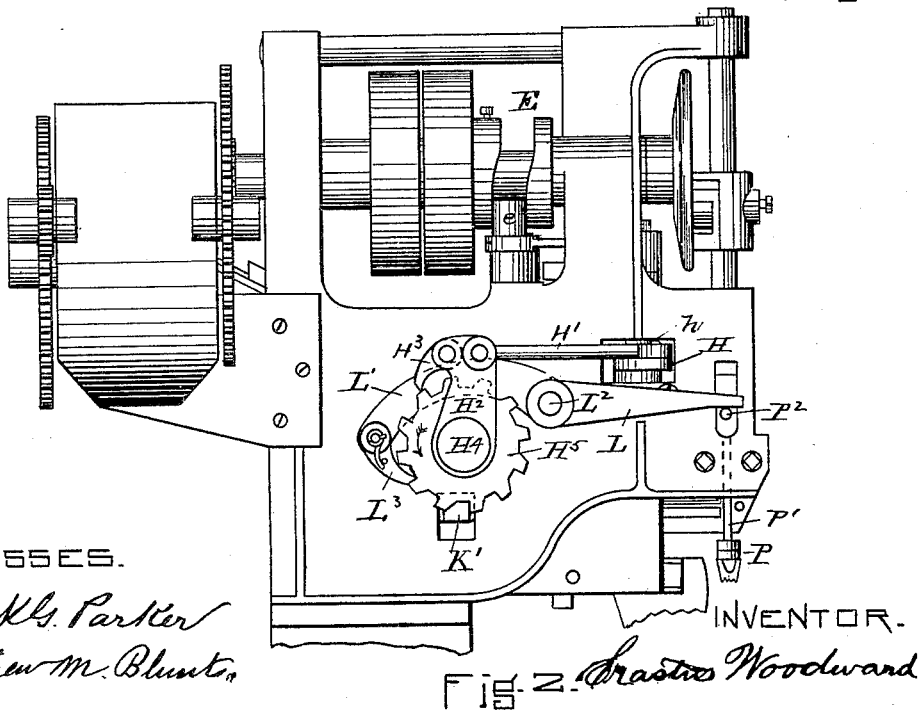
WITNESSES.
Franck G. Parker
Matthew M. Blunt
INVENTOR.
Erastus Woodward (No Model.) 2 Sheets—Sheet 2.

E. WOODWARD.
TACK-DRIVING MACHINE.

No. 426,160. Patented Apr. 22, 1890.

WITNESSES.
Frank G. Parker
Matthew M. Blunt

INVENTOR.
Erastus Woodward

UNITED STATES PATENT OFFICE.

ERASTUS WOODWARD, OF SOMERVILLE, MASSACHUSETTS.

TACK-DRIVING MACHINE.

SPECIFICATION forming part of Letters Patent No. 426,160, dated April 22, 1890.

Application filed September 7, 1889. Serial No. 323,310. (No model.)

*To all whom it may concern:*

Be it known that I, ERASTUS WOODWARD, of Somerville, in the county of Middlesex and State of Massachusetts, have invented certain new and useful Improvements in Attachments to the Feeding Mechanism of a Tack-Driving Machine, of which the following, taken in connection with the accompanying drawings, is a specification.

The object of my invention is to combine with the tack-feeding mechanism of a tack-driving machine or machines of this nature a device by which the tack-feeding apparatus, though in constant motion, cannot, when started by the operator, perform its function on more than one tack—that is, it, when started by the operator, will feed one tack and then cease its function, not to feed again until again started by the operator. In other words, by the aid of my appliance the operator may cause the constantly-running machine to feed a single tack at such a time as he may have the work ready to receive it, the feeding function ceasing automatically after a single operation. This object I attain by the mechanism shown in the accompanying drawings, in which—

Figure 4:
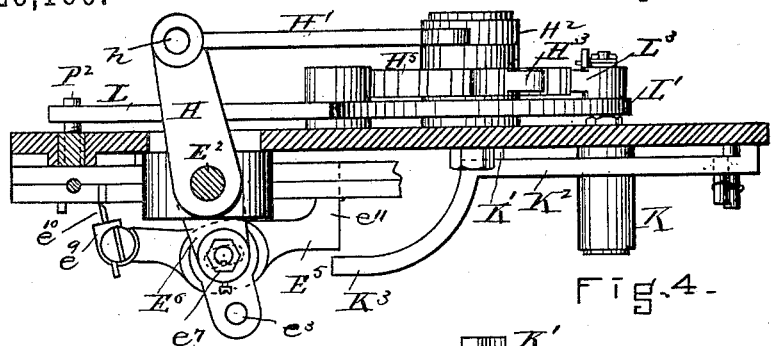
Figure 5:
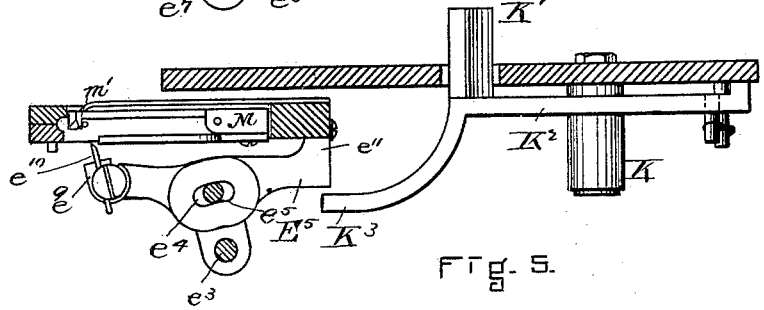
Figure 6:
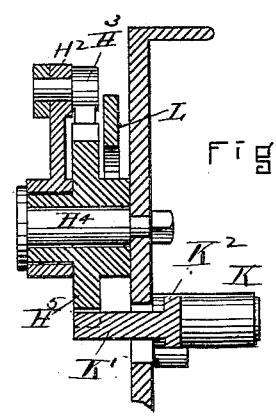
Figures 9, 10, 11, 12:
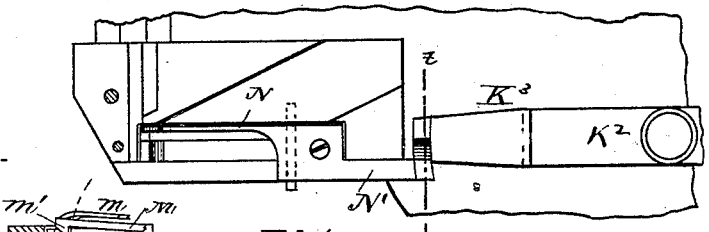
Figure 7:
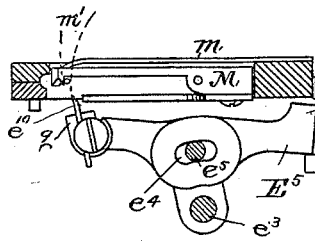
Figure 8:
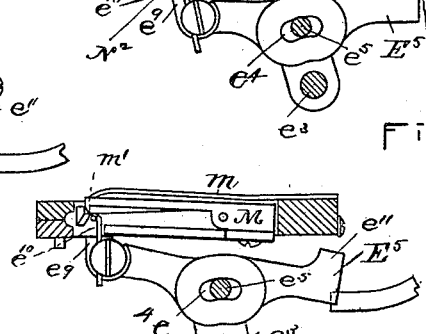

Figure 1 is an elevation of the right side of a machine for driving tacks. Fig. 2 is an elevation of the left side of the same machine, also showing a part of my attachment. Fig. 3 is a view in plan of a detail. Fig. 4 is a view partly in horizontal section on line $x\,x$ of Fig. 1 and partly in plan. Fig. 5 is a view partly in section on line $y\,y$ of Fig. 1 and partly in plan of some of the parts shown in Fig. 4. Fig. 6 shows details in vertical section on line $z\,z$ of Fig. 1. Fig. 7 shows details in section and plan, as in Fig. 5, except slight change in position of one of the parts. Fig. 8 shows detail in section and plan, as in Figs. 5 and 7, except change of position of some of the parts. Fig. 9 is an elevation of details to illustrate a slight modification of my device. Fig. 10 is a view showing the same parts slightly modified, as shown in Fig. 5. Fig. 11 shows portions of the same parts as shown in Fig. 10 in different positions. Fig. 12 is a section taken on line $t\,t$ of Fig. 9.

In the drawings I have shown my device attached to a tack-driving machine for which a patent was issued to me September 11, 1888, said patent being No. 389,275, and entitled "Tack-Driving Machine."

In the following description I will only refer to such parts of the said tack-driving machine as may be necessary for the understanding of my device. These parts constitute the contrivance employed for delivering the tacks from the chute to the tack-driver, and are shown in Figs. 1, 4, 5, 6, 7, and 8, and are described in the above-mentioned patent, substantially as follows: The chute U, Fig. 1, ends at or near the point where the tack-heads, represented by small circles, appear, as in Figs. 5, 7, 8, and 10. A hinge-block M is pivoted to the frame of the machine and thrown into the proper position by a spring $m$. This block M terminates toward the driveway of the machine in a hook $m'$, as shown in the drawings, Figs. 5, 7, 8, and 10, and this hook $m'$, when the block M is in line with the frame of the machine, serves to check the forward passage of the tacks by engaging with them. In order therefore to feed a tack forward from the point to where the chute ends, it is necessary to displace this hook.

Referring now to Fig. 1, it will be seen that there is at E a cam-wheel fastened upon the main shaft of the machine, in the groove of which wheel a cam-pin $e$ runs, which is oscillated from side to side by the action of the cam. This cam-pin $e$ actuates a bent lever $E'$, (see Figs. 1 and 3,) which is pivoted at $e'$, Fig. 3, and in turn gives motion to the lever $E^4$, attached to the rocker-shaft $E^2$, Figs. 1 and 3. From the lower end of the rocker-shaft $E^2$ an arm $E^6$ (see Figs. 1, 2, 3, and 4) extends.

To an extension $E^7$ of the arm $E^6$ is pivoted by a vertical pin $e^3$ the feed-slide $E^5$. (See Figs. 1, 4, 5, 7, and 8.) A segmental slot $e^4$ in the slide $E^5$ allows a second vertical pin $e^5$ to pass through it without interfering with its oscillating motion. The pin $e^5$ is terminated at its lower end by a disk, as shown at $e^9$, Fig. 1, and has a nut $e^7$ upon its upper end, against which a spring $e^6$ presses. The set-screw $e^8$, Figs. 1 and 3, passing through the part $E^4$, engages its point in a groove in the vertical pin $e^5$ and serves to keep it from turning.

Between the disk $e^9$ at the lower end of the pin $e^5$ (under the slide $E^5$) and the under side of the lever $E^6$ the feed-slide $E^5$ is held by friction, the amount of which is determined by the spring $e^6$ and nut $e^7$. If now the machine be set in motion, it is obvious that one end of the lever $E^6$ and its extension $E^7$ will move in the arc of a circle, taking pin $e^3$ with it. This action will carry the end $e^9$ of the slide $E^5$ in contact with the side of the working-piece M, and will by its pressure move it somewhat away from its original position, thereby carrying the hook $m'$ out of the way of the tack. At the same time a chisel-ended finger $e^{10}$ will enter behind the leading tack at the end of the chute, and at last the end $e^9$ of the slide $E^5$ will come in contact with the fixed part of the machine, as shown in Fig. 8, the pivoted block M having been displaced and the finger $e^{10}$ having entered behind a tack. In the further movement the finger $e^{10}$, moving in a slot on the side of the frame of the machine, will carry the tack forward and deposit it in the driveway. By this time the pin $e^5$ will have changed its posture in the slot $e^4$ of the slide $E^5$ from its leading end to its following end, and the operating-cam, E Figs. 1 and 2, will be in the position where the reverse action will begin to take place. The first effort of the reverse motion will be to cause the slide to oscillate on the pin $E^2$ until its heel end $e^{11}$ comes in contact with the frame of the machine. (See Figs. 4 and 5.) By this time the finger $e^{10}$ will be withdrawn from behind the tack, the hook $m'$ will have been restored to its place soon after the tack is started forward by the pressure of the spring $m$, and the slide will begin to move back horizontally, the slot $e^4$ and the slide $E^5$ moving around the pin $e^5$ until the first position of the slide $E^5$ is reached, when the slide will again rock on the pin $E^2$ and the chiseled pointed finger $e^{10}$ will enter behind another tack. Thus the tacks will be taken one by one from the end of the chute and carried forward and left in the driveway of the machine. It will be observed that the motion of the slide $E^5$ will resemble that of the so-called "four-motion feed"—that is, forward, out, back, in, and forward again.

The parts referred to in the foregoing description are old and to be found fully set forth in the specification and drawings of Patent No. 398,275, issued to me September 11, 1888, entitled "Tack-Driving Machine," and are now shown and described solely for illustrating the purpose of my present device, which I will now describe.

I attach to the rocker-shaft $E^2$ an arm H, Figs. 2, 3, and 4, which is connected by a pivot $h$ to a link $H'$, and through the said link $H'$ to the swinging arm $H^2$, Figs. 2, 4, and 6. This swinging arm $H^2$ is pivoted to the center $H^4$, (see Fig. 2,) about which center a ratchet-wheel $H^5$ turns.

$H^3$ is a pawl attached to the swinging arm $H^2$, and is intended at the will of the operator to engage with the ratchet-wheel $H^5$, as will be explained.

As the link $H'$ is connected to the rocker-shaft $E^2$ and by mechanism already explained to the cam E and main shaft of the machine, it is obvious that the swinging arm $H^2$ and pawl $H^3$ must be in constant motion when the machine is in operation. It is also to be understood that the feeding-slide $E^5$ and its adjuncts are always in operation, so that the tacks will be constantly fed into the driver as long as the machine is in motion, unless the feeding motion of the slide $E^5$ is made of non-effect as regards feeding the tacks.

The object of my device is not to stop the machine or the motion of the feeding-slide, as that is found to be very troublesome, as well as injurious to the entire machine.

I will now explain how the feeding motion of the slide $E^5$ is annulled as far as its action on the tack is concerned. The feeding-slide $E^5$ as it moves forward in its normal action dips its finger $e^{10}$, so as to come in contact with a tack and feed it to the driver, as has been explained, and if it does not dip then no feeding action will take place. My device prevents this dipping of the slide $E^5$ when it is desired to stop its action on the tack, and consists of a lever $K^2 K^3$, pivoted at K, Figs. 1, 4, 5, and 6, and adapted to swing in a vertical plane just behind the rear end of the feeding-slide $E^5$. If the end $K^3$ of the lever $K^2 K^3$ is on a level with the rear end of the slide $E^5$, then the said slide $E^5$ cannot dip in its forward motion, and hence the finger $e^{10}$ will not engage with the tack and of course cannot feed it along; but if the end $K^3$ of the lever $K^2 K^3$ is forced down (as will be explained) so as to be below the rear end of the feeding-slide $E^5$, then the said slide will be free to do its work.

The motion of the lever $K^2 K^3$ is controlled by the following device, (see Figs. 4 and 5:) The lever $K^2 K^3$ has a horizontal arm $K'$, which, as shown in Fig. 2, normally rests in one of the notches of the wheel $H^5$, in which case the end $K^3$ is back of the rear end of the feeding-slide $E^5$, and, as has been stated, prevents the said slide from doing its work of feeding the tack. Now, if the wheel $H^5$ is allowed to move it will force the arm $K'$ and with it the end $K^3$ of the lever $K^2 K^3$ down out of the way of the feeding-slide and allow the said slide to do its work.

To cause the wheel $H^5$ to rotate, I have the following device: The moving pawl $H^3$ is so arranged in relation to the teeth of the wheel $H^5$ that if the wheel is in the position shown in Fig. 2 then the whole throw of the said pawl will not bring it far enough to the right to enable it to engage with a tooth; hence the pawl will simply move back and forth and not cause the wheel $H^5$ to move at all; but if the wheel $H^5$ is slightly rotated in the direction of the arrow—that is, enough to force the arm $K'$ on the lever $K^2 K^3$ down, so as to allow the feeding-slide to work—then the pawl H³ will engage with one of the teeth and move it so that the arm K' of the lever K² K³ will fall into the next notch, and the lever K² K³ will again be in position to prevent the feeding-slide E⁵ from working.

I will now describe my auxiliary apparatus or my device for giving the wheel H⁵ the motion above referred to for enabling the slide E⁵ to do its work. Referring to Fig. 2, a lever L L' is pivoted at L² and has at its end L' a pawl L³, so arranged that if the rear end of the said lever is elevated the pawl L³ will engage with one of the teeth of the wheel H⁵ and send it forward, so as to depress the arm K' and through it the end K³ of the lever K² K³, allowing the feed-slide E⁵ to work, and also placing the wheel H⁵ in such a position that the next movement of the pawl H³ will forward the wheel into such a position that the arm K' will come back into its normal position.

The lever L L' is independent of the going parts of the machine, and is controlled by the operator by the following arrangement: The end L of the lever rests upon a pin P², projecting from a vertical rod P', at the lower end of which I attach a foot-piece P, which, as shown in Fig. 1, is pressed upon (upwardly) by the sole of the shoe—that is, when the operator is ready for a tack to be driven he puts the shoe in the proper position and by pressing it upward causes the piece P, rod P', and pin P² to move the lever L L', and through it and the pawl L³ and wheel H⁵ and the other connected mechanism causes a tack to be fed into the driveway, from whence the constantly-going machine will drive the tack as desired.

In Figs. 9, 10, 11, and 12 I have shown a modification of my device, in which I add to the swinging block M a plate N N'. At the end N of this plate I have a projection N², and I have the hook m' so far back as to hold the tack out of the path of the finger e¹⁰, so that the tack will not be fed forward by the finger e¹⁰ unless it is first pushed forward by the wedge-shaped projection N², as shown in Fig. 11. To thus push the tack forward, I have at the end N' of the plate N N' a wedge-shaped projection, (see Figs. 9 and 10,) which is engaged with by the end K³ (also wedge-shaped) of the lever K² K³ and pushed outward. This action throws the wedge-shaped projection N² in back of the tack and pushes it forward into the working-field of the finger e¹⁰, the lever K² K³ being operated as has been already described.

By the use of my attachment the attendant can have his machine running continuously without having it feeding and consequently wasting tacks, and when he wishes a tack to be fed he has only to pass the shoe upward and a single tack is fed and driven, the feeding stopping until he again presses the shoe to the work.

I claim—

1. In a continuously-running tacking-machine, the combination of a feed device normally inoperative with the movable foot-piece P and its connected mechanism, whereby the feed device is made to feed one tack and then become inoperative, substantially as and for the purpose set forth.

2. In a machine for driving loose tacks or other small articles, the combination of the feed device, substantially as described, with the foot-piece P and its connected mechanism, and the ratchet-wheel H⁵, substantially as described, and for the purpose set forth.

3. In a machine for feeding loose tacks from a hopper to a driving apparatus, the combination of the cam E, bent lever E', lever E⁴, rocker-shaft E², arm E⁶ E⁷, and feed-slide E⁵ with the lever K² K³, ratchet-wheel H⁵, moving pawl H³, swinging arm H², link H', arm H and its operating mechanism, the foot-piece P, rod P', pin P², lever L L', and pawl L³, substantially as and for the purpose set forth.

In testimony whereof I have signed my name to this specification, in the presence of two subscribing witnesses, on this 5th day of September, A. D. 1889.

ERASTUS WOODWARD.

Witnesses:
FRANK G. PARKER,
MATTHEW M. BLUNT.